(12) United States Patent
Muldoon

(10) Patent No.: US 6,923,172 B2
(45) Date of Patent: Aug. 2, 2005

(54) SYSTEM AND METHOD FOR CONSTRUCTING A BARBEQUE ISLAND

(75) Inventor: Kenneth Andrew Muldoon, Pinckney, MI (US)

(73) Assignee: Natural Creations Corporation, Whitmore Lake, MI (US)

( * ) Notice: Subject to any disclaimer, the term of this patent is extended or adjusted under 35 U.S.C. 154(b) by 0 days.

(21) Appl. No.: 10/250,022

(22) Filed: May 29, 2003

(65) Prior Publication Data

US 2004/0237955 A1 Dec. 2, 2004

(51) Int. Cl.[7] .............................................. F24C 15/08
(52) U.S. Cl. ........................ 126/8; 126/25 R; 126/9 R
(58) Field of Search ........................ 126/8, 25 R, 9 R, 126/41 R

(56) References Cited

U.S. PATENT DOCUMENTS

| | | | | |
|---|---|---|---|---|
| 3,289,666 | A | * 12/1966 | Prather | ........................ 126/500 |
| 3,561,420 | A | 2/1971 | Paolella | |
| 4,628,901 | A | 12/1986 | Poulos | |
| 5,183,027 | A | 2/1993 | Saldana | |
| 6,128,793 | A | * 10/2000 | Weinstein | ........................ 4/631 |
| 6,189,526 | B1 | 2/2001 | Bland | |
| 2004/0065313 | A1 | * 4/2004 | Thompson | ................ 126/37 R |

OTHER PUBLICATIONS

Sunset Books, "Building Barbecues & Outdoor Kitchen" by Donald W. Vandervort, 2nd edition, Jan. 1, 2001.*
Article "Barbecues by Cal Flame", http://www.calspas.com/barbecues/barbecues_bottom.asp.*

* cited by examiner

*Primary Examiner*—Jiping Lu
(74) *Attorney, Agent, or Firm*—Dykema Gossett PLLC; Jerome R. Drouillard

(57) ABSTRACT

A method and system for constructing a barbeque island includes providing a block module with a grouping of individual structural blocks, such as landscape retaining wall blocks, having a number of block configurations in a single package of blocks. A hardware module includes a grill insert, various counter tops, and other accessories. The blocks are assembled into a variety of unique and non-unique courses and the grill insert, which has an enclosed firebox and cooking surface is mounted upon the assembled courses of blocks.

7 Claims, 8 Drawing Sheets

SYSTEM AND METHOD FOR CONSTRUCTING A BARBEQUE ISLAND

BACKGROUND OF INVENTION

1. Field of the Invention

The present invention relates to a modular system and method for building a barbeque grill island using a block module and a hardware module. The block module has a grouping of individual structural building blocks, which may comprise exterior landscaping wall blocks, with the blocks having a plurality of configurations. The hardware module includes a grill insert having an enclosed firebox, a cooking surface and a cover, and may also include counter tops, hardware, and other accessories.

2. Disclosure Information

Barbeque grills have evolved from little more than a circular formation of rocks resting on the ground and tended by prehistoric cooks, to increasingly more elaborate devices. As barbeque grills have become more elaborate, the expense of such grills has grown proportionally. A good deal of the expense arises from the necessity, where masonry is used, was obtaining the services of a skilled mason to lay blocks or bricks using mortar. Of course, the cost of skilled labor renders such grills generally unattainable for most of those desiring such accommodations. In their efforts to avoid the need for mortaring components, inventors have attempted to use components which may be laid without mortar. U.S. Pat. No. 3,561,420 and U.S. Pat. No. 6,189,526 B1 disclose barbeque arrangements in which large precast blocks are used to form the barbeques. Unfortunately, the grills illustrated in the '420 and '526 patents suffer from the problem that custom made blocks must be used and such blocks are prohibitively expensive because the production volume is understandably low and freight charges for shipping such blocks are high. Moreover masonry components tend to be breakable and therefore further adversely affect the economic practicability of the grills shown in the '420 and '526 patents.

In contrast with the prior art, the present inventors have developed a system which allows the construction of barbeque grill island using individual wall blocks which need not be molded or mortared together. Such blocks are commonly available at landscaping supply companies which are ubiquitous. Once a predetermined grouping of blocks has been shipped to a consumer point of use, the blocks will be combined into stacked courses using a layout schematic and sequential instruction set furnished with the hardware module. Once the stacked courses and cap course have been laid without the use of mortar, the hardware may be inserted and the barbeque island put to use.

SUMMARY OF INVENTION

A system for constructing a barbeque island includes a plurality of individual wall blocks, which may comprise landscaping concrete retaining wall blocks, other types of wall blocks known to those skilled in the art and suggested by this disclosure. A sequential instruction set including a layout schematic for each of a plurality of stacked courses directs the user in assembling the wall blocks in a plurality of stacked courses and a cap course, wherein at least one of the stacked courses has a layout configuration which is unique with respect to all others of the stacked courses. A firebox support structure is integrated with the stacked courses and is preferably integrally formed from the retaining wall blocks. A grill insert having a firebox and a plurality of support members for engaging the firebox support structure includes the firebox, the cooking surface and cover. The firebox may be adapted to burn either gaseous fuel or solid fuel. As noted above, the wall blocks may either comprise landscape retaining wall blocks, concrete retaining wall blocks or other types of concrete or clay building blocks. In any event, the blocks will normally have a plurality of configurations and a plurality of sizes.

In order to allow the grill insert to accommodate a variety of types of wall blocks obtained from a variety of different wall block manufacturers, the grill insert preferably comprises a adjustable grill control panel mounted in front of and slightly below the top of the firebox. The control panel preferably has adjustable end caps and the panel itself is adjustable in term of its angular position with respect to the firebox. In this manner, incidental changes in the dimension of the stacked block courses and cap course may be accommodated by a single grill insert.

Another feature of a system for constructing a barbeque grill island according to the present invention resides in the notion that at least some of the wall blocks are configured and adapted to be reversed in a course so as to allow the length of the stacked course to be adjusted. Advantageously, this adjustment may be made without the need for cutting the blocks.

According to another aspect of the present invention, a modular method for constructing a barbeque grill includes the steps of providing a block module having a predetermined grouping of individual structural blocks corresponding to a predetermined wall block package, and providing a grill module including at least an instruction set showing a schematic for each of a plurality of block courses and a grill insert. The present method further includes the steps of assembling a plurality of unique and non-unique stacked block courses from the predetermined grouping of blocks, using the block course schematic specification contain within the instruction set and mounting an enclosed firebox of the grill insert to at least one of the unique stacked block courses. The present method may further include the step of mounting at least one counter support bracket to an upper portion of the stacked block courses and mounting at least one counter top to the counter support bracket.

The present method further includes the steps of adjusting the angular position of a adjustable control panel and the lateral position of an adjustable end cap attached to the control panel.

It is an advantage of the present system and method that a custom barbeque grill island may be built on site by a homeowner without the need of any adhesives for all but the cap course, and perhaps more importantly, without the need for cutting of any of the stacked course blocks used in constructing the present barbeque.

It is a further advantage of the present invention that a provision of a sequential stacked block course instruction set allows the construction of the present barbeque grill island by persons untaught in the art of building masonry structures.

It is a further advantage of the present invention that a system and method according to the present invention allows a consumer to build a custom barbeque grill island at very low cost as compared to grills requiring the use of highly skilled labor.

It is a further advantage of the present invention that the present system and method allows many types of grill island configurations to be built with common hardware items.

It is a further advantage of the present invention that present barbeque island may be disassembled and moved to another site at any time by the owner of the grill.

Other advantages, as well as features and objects of the present invention, will become apparent to the reader of this specification.

DETAILED DESCRIPTION

Figure 1:
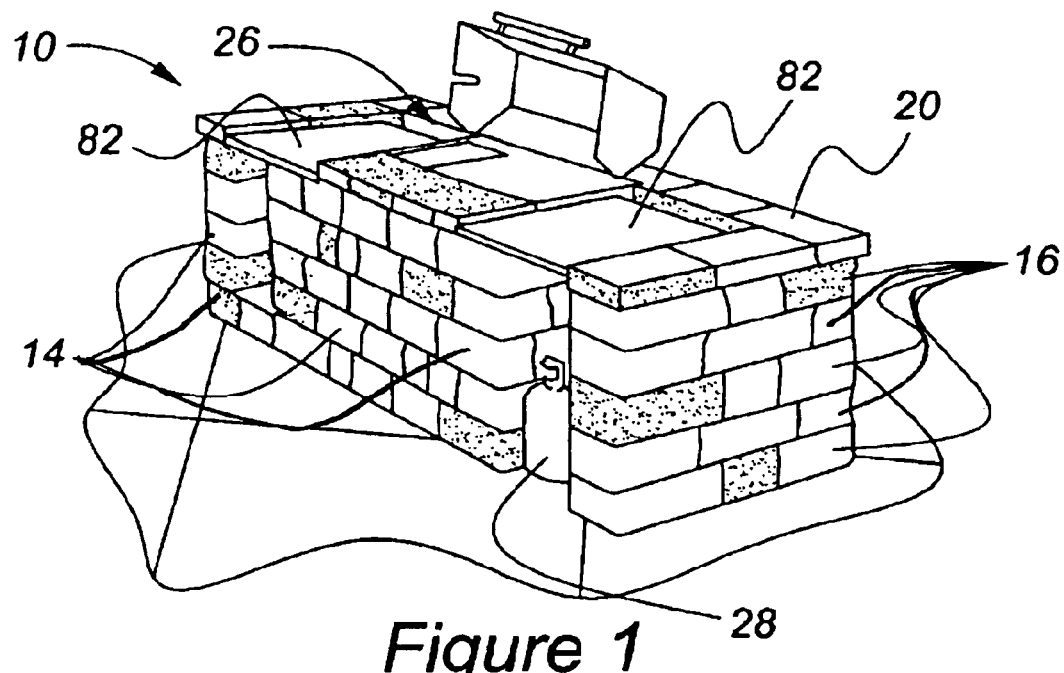
FIG. 1 is a perspective view of a first barbeque island according to the present invention.

As shown in FIG. 1, barbeque island 10 includes a plurality of stacked courses 16, in this case numbering five stacked courses surmounted by cap course 20. Each of courses comprises a number of individual blocks 14. At least one of stacked courses 16 is unique from all other such stacked courses. Grill insert 26 is mounted into a firebox support structure which is integrated with stacked courses 16. This firebox support structure will be discussed below in connection with FIG. 5.

The barbeque island shown in FIG. 1 further comprises gas bottle 28 and plurality of counter tops 82 which may support either food preparation areas, or an additional burner, or both.

Figure 2:
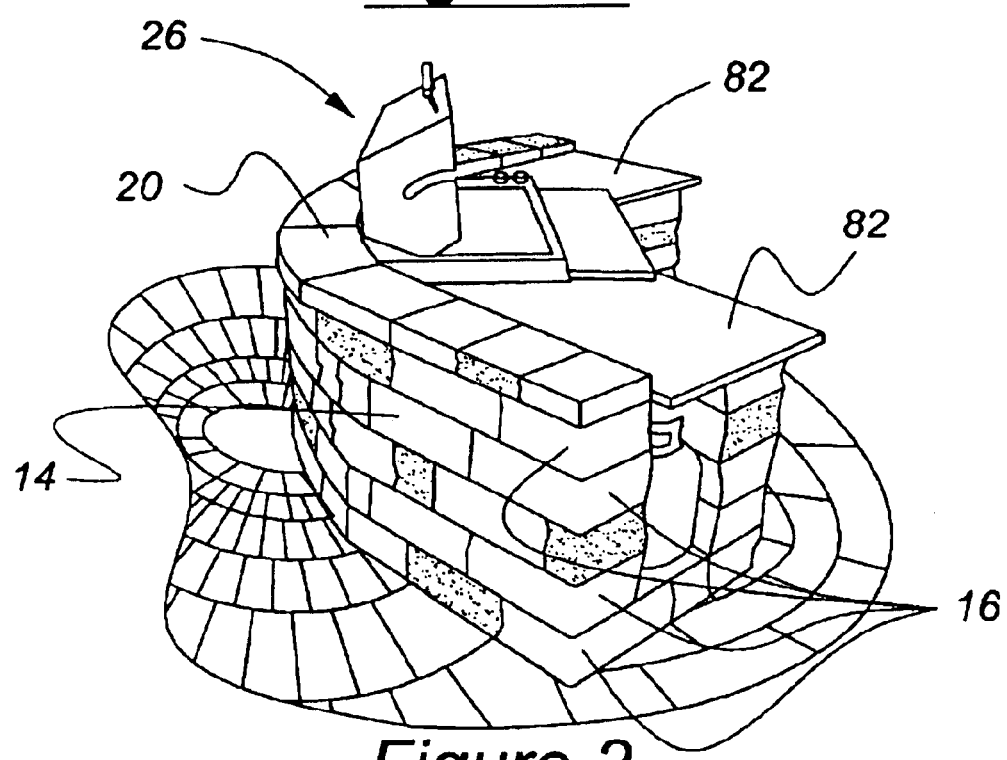
FIG. 2 is a perspective view of a second embodiment of a barbeque island according to the present invention

FIG. 2 shows a second embodiment according to the present invention having a partially rounded configuration, but retaining the stacked courses 16, cap course 20 and grill insert 26. As with FIG. 1, FIG. 2 is assembled without the necessity of cutting any of the blocks 14 utilized in construction of the grill island.

Figure 3:
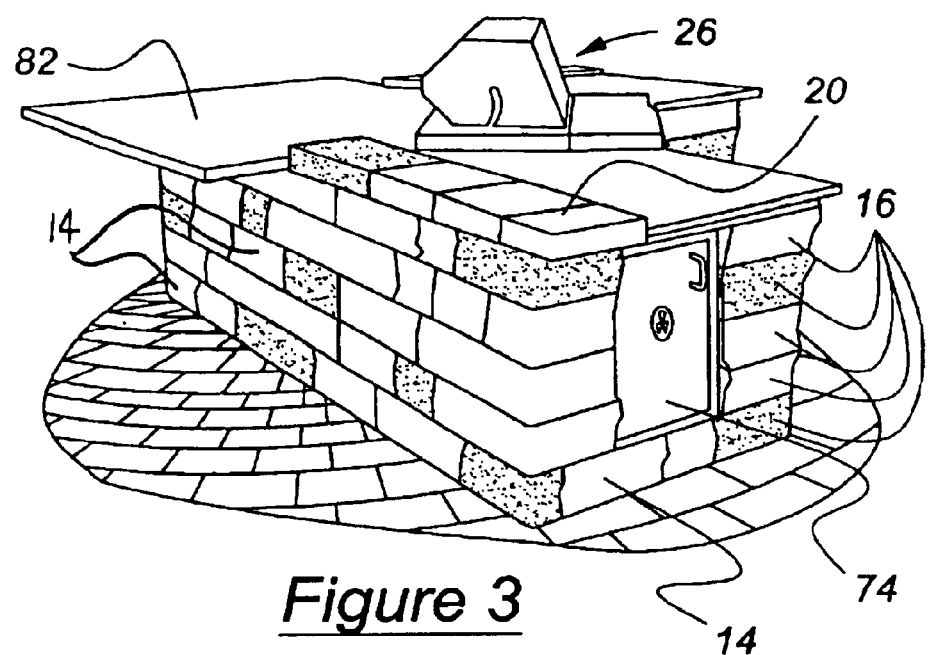
FIG. 3 is a perspective view of a third barbeque island according to the present invention.
Figure 11:
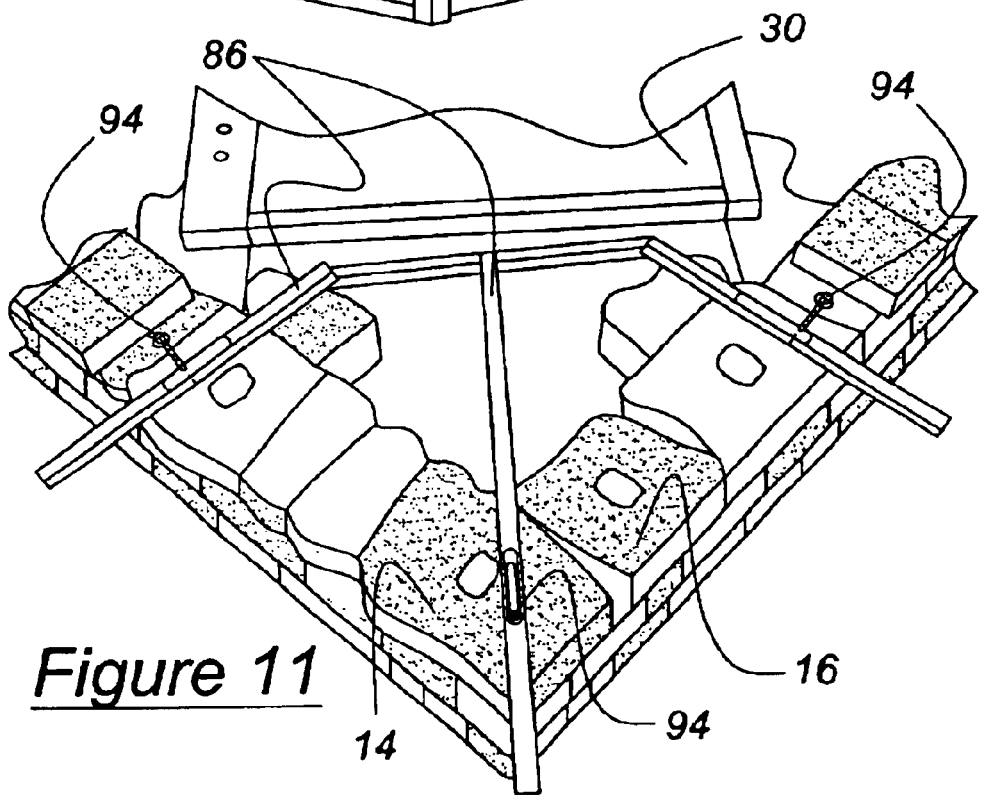
FIG. 11 illustrates a counter top bracket according to another aspect of the present invention.

FIG. 3 illustrates a grill island according to the present invention having a large table top and counter surface 82 which is supported by bracket 86 shown in FIG. 11. Bracket 86 is cantilevered from the uppermost of stacked courses 16. Bracket 86 comprises a plurality of radially extending hollow metal members 88, each of which has a pin 94 extending down into the uppermost of stacked courses 16. In this manner, once counter top 82 is applied to counter/table bracket 86, top 82 will be soundly supported, thereby avoiding risk of tipping or breaking counter top 82. The barbeque island of FIG. 3 is also equipped with smoker chamber 74.

Figure 4:
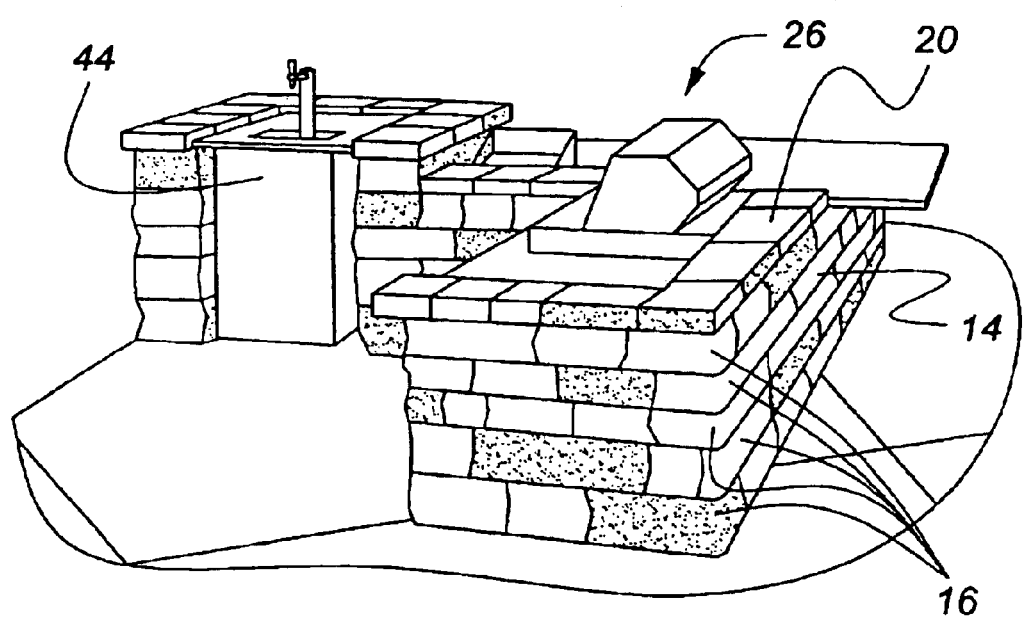
FIG. 4 is a perspective view of a fourth barbeque island according to the present invention.

FIG. 4 illustrates a barbeque island according to the present invention in which grill insert 26 is combined with a cooler assembly 44 so as to provide beverages for those enjoying a barbeque.

FIG. 5 is instructive as to an important aspect of the present invention. FIG. 5 illustrates the configurations of the five stacked courses, 5A through 5E, which comprise the stacked courses required to build the barbeque island of FIG. 1. Course 5A is the course nearest the ground and it is placed upon a prepared surface such as paving blocks, compacted aggregate, concrete or any other surface capable of bearing the weight of a barbeque island according to the present invention. It may be noted from the various FIGS. 5A–5E that plurality of wall blocks 14 includes a number of different sizes and configurations. In essence, this necessitates the schematics shown in 5A 5E, which comprise a sequential instruction set having a unique layout schematic for at least one unique course of blocks 14. More precisely, no two of the courses shown in FIGS. 5A through 5E are identical. FIG. 5C shows grease trap 90, which may be fabricated in the form of a shallow pan made of various metals or nonmetals known to those skilled in the art and suggested by this disclosure. Grease trap 90 is set into course 5C in much the same manner as one of blocks 14.

Dimensional tolerances must be obeyed in the laying up of the courses 5A–5E, and for this purpose, the blocks labeled "A" in each of the courses may be reversed so as to allow the dimension of the courses to be adjusted. Reversal of the blocks labeled A allows the block to be telescoped or "nest" at their beveled edges into one another, so as to allow the course to shrink or grow according to how the beveled feature of the blocks is employed.

Figure 5A:
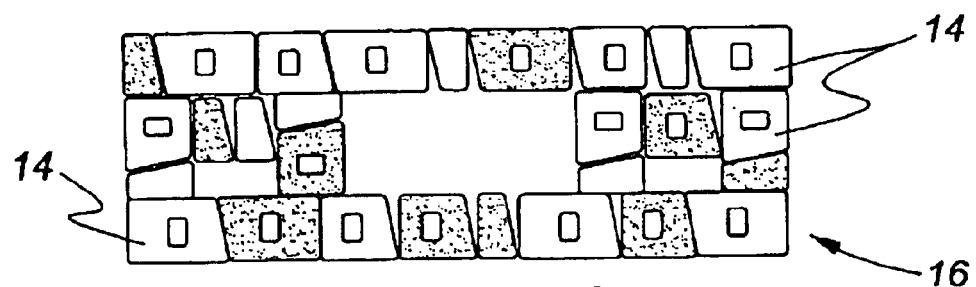
FIGS. 5A–E comprise a sequential instruction set illustrating various layout schematics for stacked courses of wall blocks for use in building the barbeque island illustrated in FIG. 1.
Figure 5B:
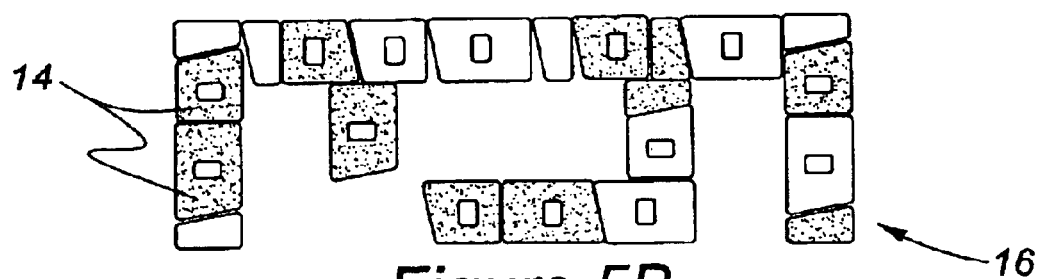
Figure 5C:
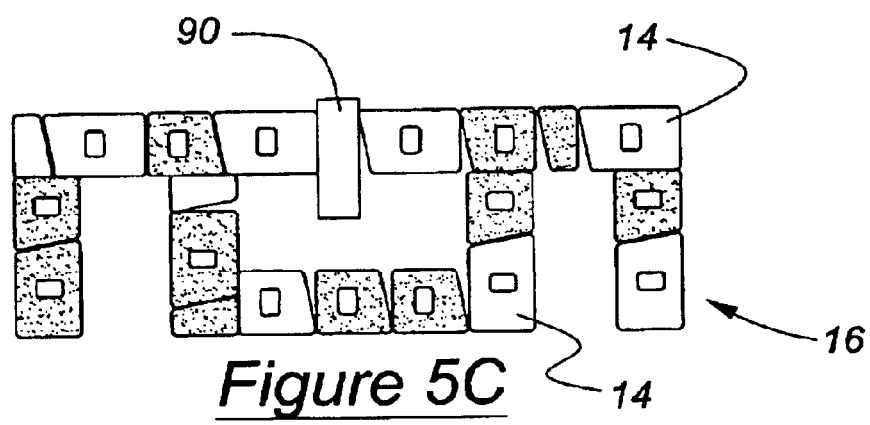
Figure 5D:
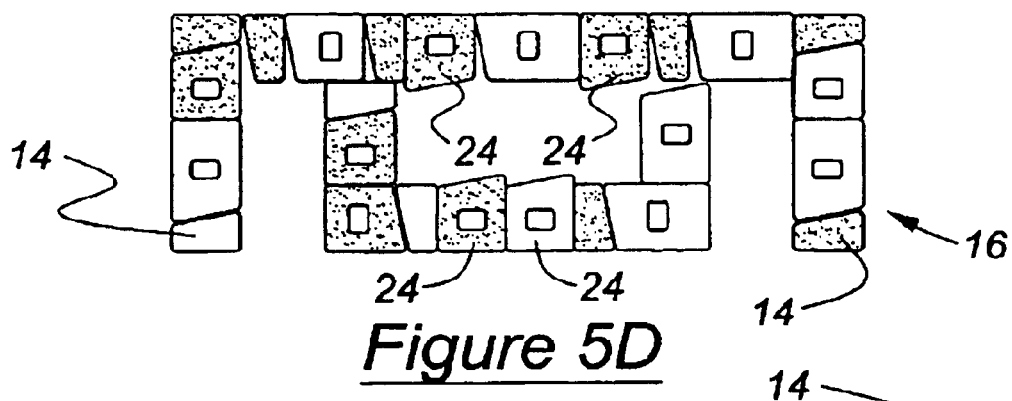
Figure 5E:
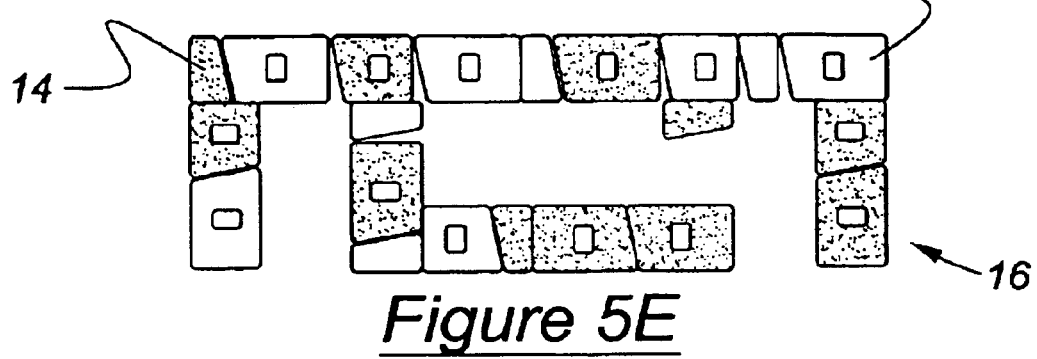

FIG. 5D shows a plurality of support blocks 24 which are turned in so as to allow a grill insert to be supported on the turned-in blocks 24. This allows grill insert 26 to be supported without the need or expense of additional hardware.

Figure 6:
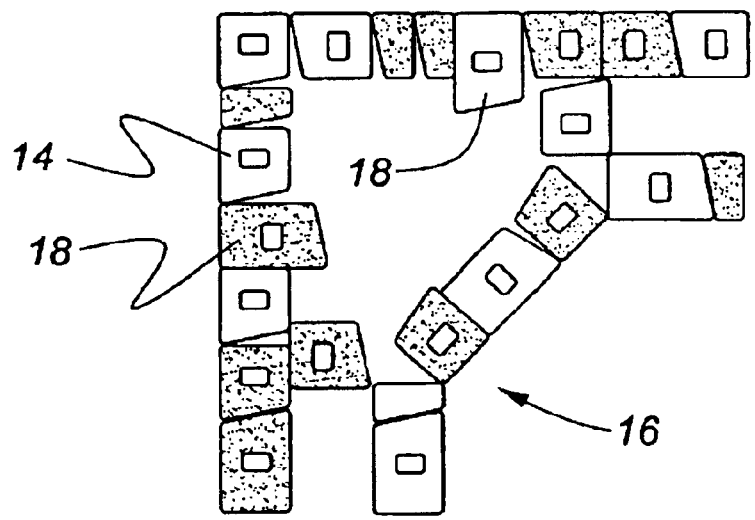
FIG. 6 illustrates a stacked course in this case, Course No. 4, for the barbeque island shown in FIG. 3.

FIG. 6 shows a block layout for a portion of the barbeque island illustrated in FIG. 3. More specifically, the fourth course from the ground level of the barbeque island FIG. 3 is illustrated. The blocks labeled 18 in FIG. 6 are employed for the purposes of mounting firebox 30 of grill insert 26.

If the particular blocks employed to build a barbeque island according to the present invention are equipped with alignment rod holes, rods may be used between the various stacked courses. Those skilled in the art will appreciate in view of this disclosure that certain holes may not be in a position to accept an alignment rod, but this occasional mismatch will not impair the structural integrity of a grill island according to this invention. Similarly, although it is not normally necessary to apply adhesive between stacked courses 16; top cap 20 will usually be maintained in place through the use of a structural adhesive.

Figure 7:
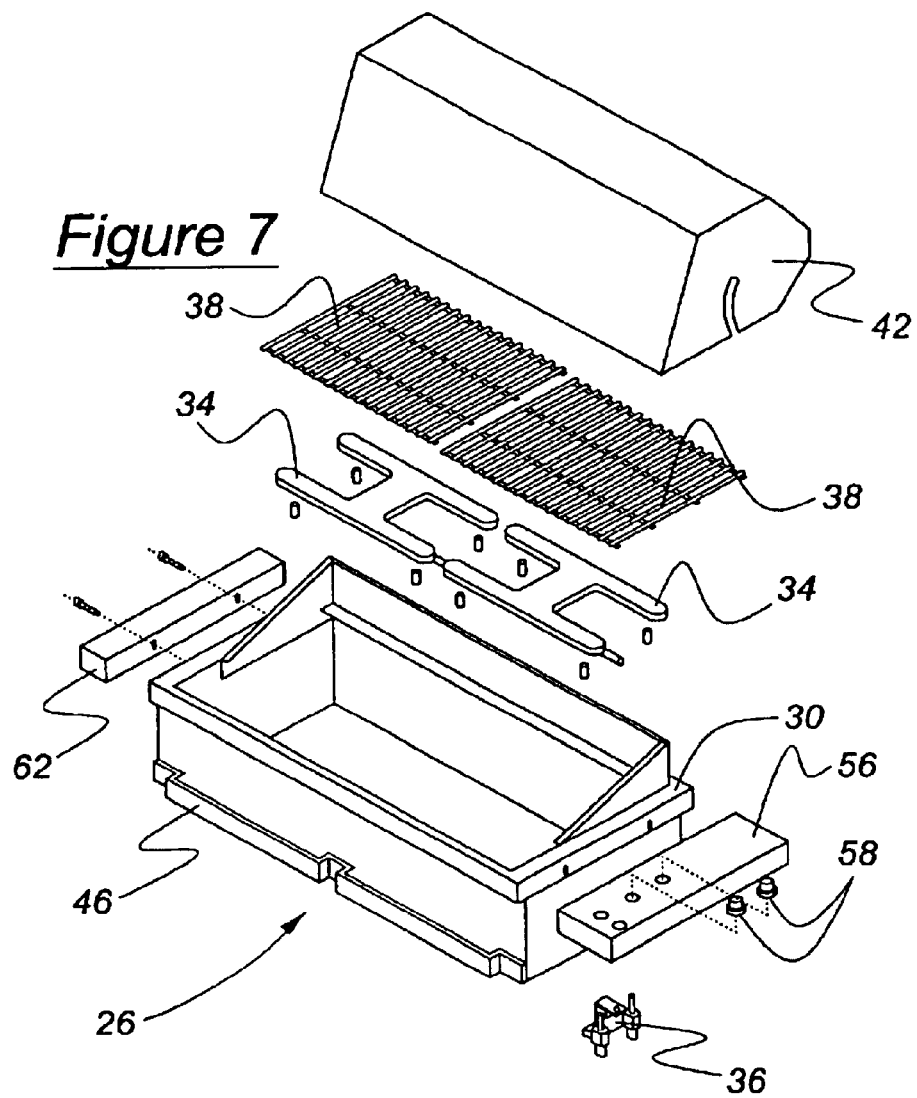
FIG. 7 is a exploded perspective view of a grill insert according to one aspect of the present invention.

FIG. 7 illustrates a grill insert according to the present invention. Grill insert 26 includes firebox 30 having support rails 46 supplied to the front and back thereof. Support rails 46 each comprise a relatively flat strip of metal which is fixed horizontally to the outer front and rear surfaces of firebox 30. Firebox 30 contains gaseous fuel burner 34 which underlies a fuel grate 38 which may have lava rocks or other favor enhancing and thermally resistant structures stacked thereon. As an alternative, burner 34 may be omitted and solid fuel merely applied to lower grate 38. Cooking grate 48 is provided above lower grate 38 so as to support food being cooked within grill insert 26. Cover 42 is applied to firebox 30 in a hinged manner so as to allow cover 42 to be rotated down so as to enclose firebox 30 and cooking surface 48.

Figure 8:
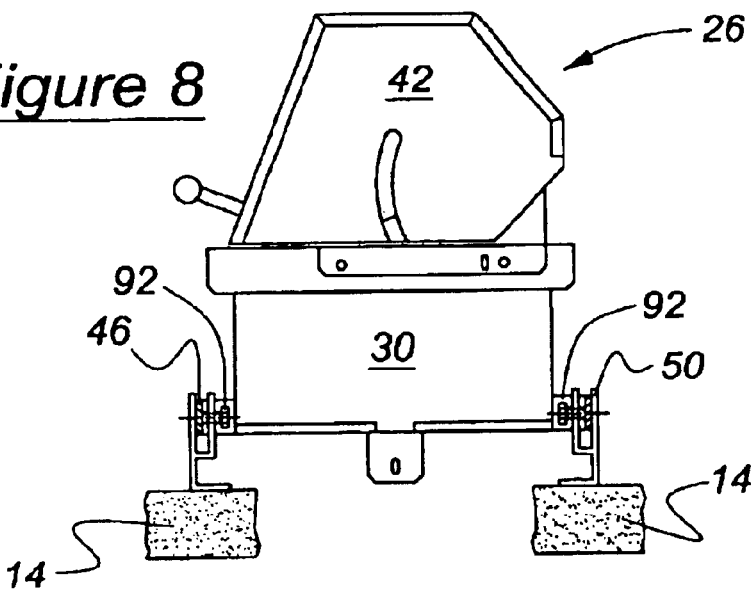
FIG. 8 is a side view of the grill insert shown in FIG. 7, and particularly shows a plurality of stand off brackets for adjustably mounting a firebox according to the present invention.
Figure 12:
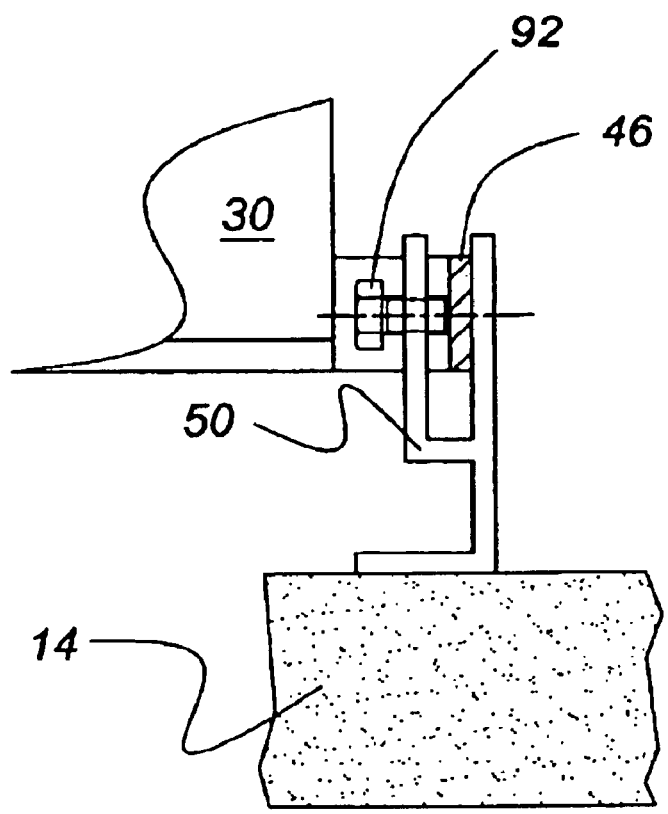
FIG. 12 illustrates a stand off bracket for mounting a firebox according to another aspect of the present invention.

FIG. 8 is a side view of the grill insert shown in FIG. 7, showing with particularity individual blocks 14 to which firebox 30 is mounted. A plurality of stand off brackets 50 is applied to support rails 46 mounted at the front and rear of firebox 30. As shown in FIG. 12, stand off brackets 50 are configured as a double-shear mount preferably comprising high strength, heat resistant material such a metal or appropriate selected composite materials. Each stand off bracket 50 has a pinch bolt 92 for maintaining the stand off bracket in contact with one of support rails 46. Those skilled in the art will appreciate in view of the this disclosure that the adjustability provided by stand off brackets 50 allows the present hardware module to accommodate a variety of block configurations and island designs for the simple reason that it is not always possible to predict precisely how high the courses of blocks will run. A further aspect of adjustability is shown in FIG. 7 by presence of adjustable side panel 62 and adjustable side mount control panel 56 having control knobs 58. Both of these panels i.e., 56 and 62, may be adjusted upwardly or downwardly by means of slotted holes so as to accommodate differing dimensions of the blocks and design configurations of a grill island according to the present invention.

Figure 9:
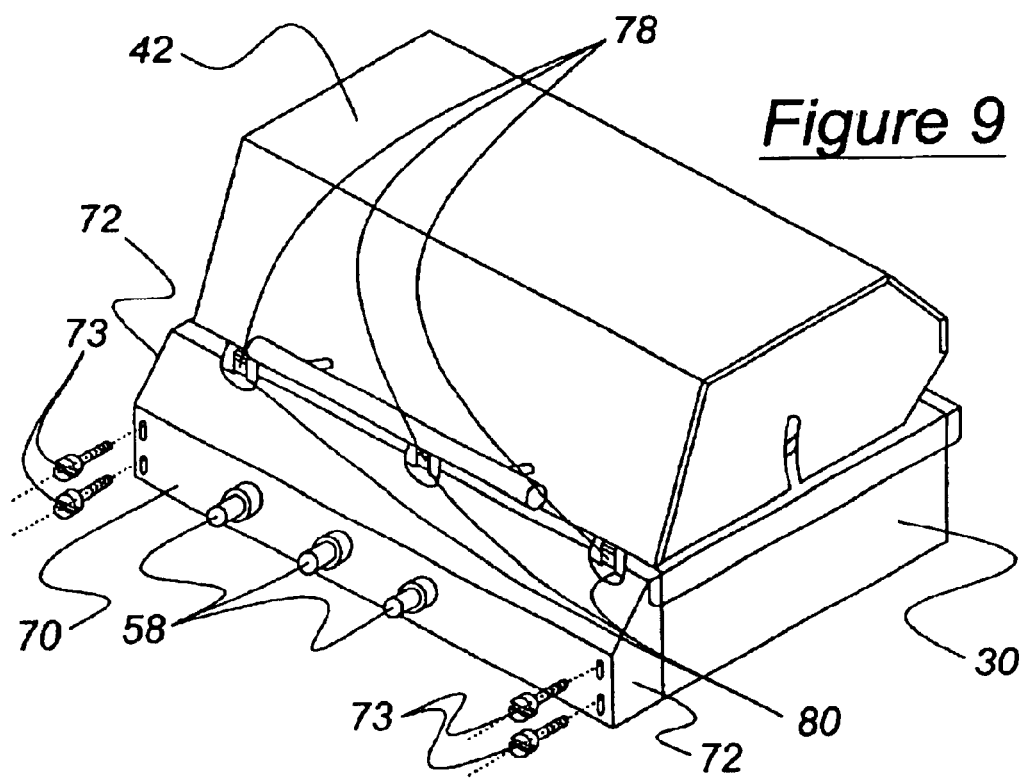
FIG. 9 illustrates a perspective view of a second firebox and associated hardware according to the present invention.

FIG. 9 illustrates a second embodiment of a grill insert according to the present invention, in which the controls instead of being mounted on the side of the unit, as with the grill insert of FIGS. 7 & 8, are mounted to the front of the grill insert by means of adjustable control panel 70 which is in front of firebox 30 and below the top of the firebox. Adjustable control panel 70 has two major adjustments. First, end caps 72 may be moved laterally, inwardly or outwardly so as to extend the effective length of adjustable control panel 70. This adjustability is facilitated by means of screws 73 which attach adjustable end caps 72. Also, adjustable control panel 70 may be rotated by means of a tab and slot combination shown as a plurality of tabs 78 formed on control panel 70, which are received by a plurality of slots 80 formed in the front surface of firebox 30. This adjustment, too, will allow incidental mismatches of grill insert 26 with stacked courses 16 and/or cap course 20 of a grill island according to the present invention. The grill insert shown in FIG. 9 utilizes control knobs 58 mounted on adjustable control panel 70, for the ease of the operator of a grill island according to the present invention.

Figure 10:
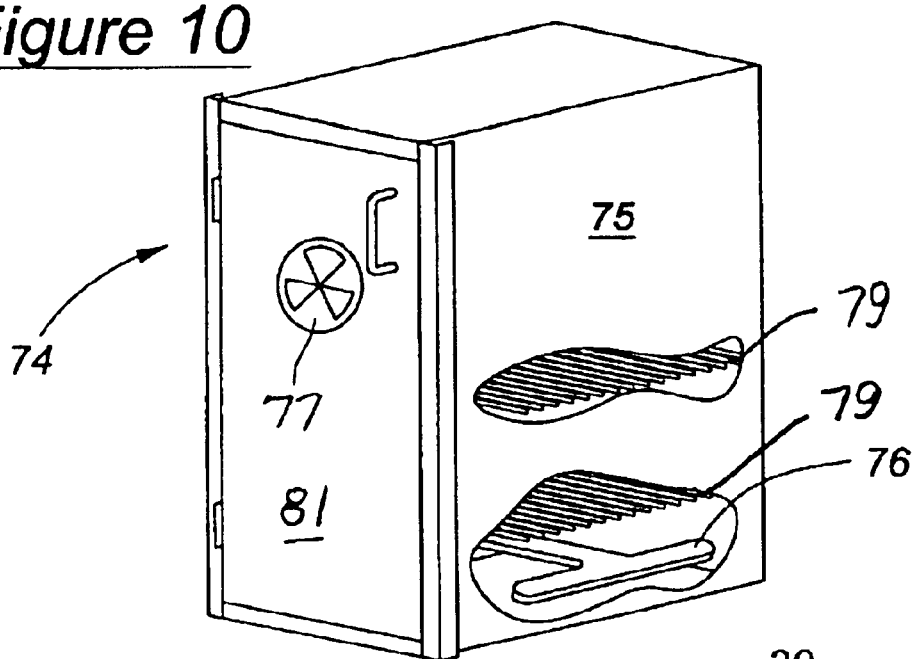
FIG. 10 illustrates a smoke chamber useful for practicing the present barbeque island invention.

FIG. 10 illustrates smoke chamber 74 according to another aspect of the present invention. Smoke chamber 74 is shown as having been installed in the grill island illustrated in FIG. 3. Smoke chamber 74 comprises cabinet 75 having a burner 76 located therein with an adjustable vent 77 formed in door 81 of smoke chamber 74. Various racks 79 are disposed in the interior of smoke chamber 74 to allow for placement of various smoking ingredients and meat or other food to be smoked. Smoke chamber 74 may be utilized as a storage cabinet, when not in use for smoking food. If desired, the front fascia of smoke chamber 74 may be adjustable so as to cover various size openings. This adjustability is not shown.

The various grill insert parts and smoke chamber 74 according to the present invention are preferably constructed of a durable, heat resistant material such as welded metal, which may for example comprise stainless steel. Other metals and methods of construction for firebox 30 and related items according to the present invention will become apparent to the reader of this specification.

The facility and economy with which a grill island may be assembled according to the present invention is further underscored by the fact that the present grill islands may be assembled using pre-packaged or pre-determined packages of blocks normally used for building landscape retaining walls. In this manner, the need for labor at the block supplier or landscape supplier is mitigated because the supplier of the blocks need only provide packages of blocks which are either already in the supplier's yard or readably obtainable from one of a plurality of landscape blocks suppliers. This provides additional cost avoidance for the consumer of the present grill island packages, because the block supplier need not expend time to sort through various stacks of blocks searching for only selected block configurations. This allows the block modules to be sourced with one supplier, with the hardware module coming from a different supplier. This true modularity in turn allows additional cost reduction because long distance freight costs from the manufacturer of the hardware module alone will be much less than where the entire kit must be shipped to a given location. Thus, the grill hardware module may be shipped from a central location with the block module being obtained locally at a much lower cost.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A system for constructing a barbeque island, comprising:
 a block module comprising a grouping of individual exterior landscaping wall blocks, with said wall blocks having a plurality of configurations; and
 a hardware module comprising:
 a sequential instruction set for assembling said wall blocks into a plurality of stacked courses and a cap course, with said instruction set comprising a layout schematic for each of said courses, and with at least one of said stacked courses having a layout configuration which is unique with respect to all others of said stacked courses;
 a firebox support structure integrally formed from said wall blocks; and
 a grill insert having an enclosed firebox, a cooking surface supported on said firebox, and a cover, with said firebox having a plurality of adjustable support members for engaging said firebox support structure.

2. A system for constructing a barbeque island according to claim 1, wherein said wall blocks comprise cast concrete retaining wall blocks.

3. A system for constructing a barbeque island according to claim 1, further comprising at least one table top unit adapted to be placed upon and supported by a bracket mounted to one of said stacked courses.

4. A system for constructing a barbeque island according to claim 1, wherein said firebox is adapted to burn gaseous fuel.

5. A system for constructing a barbeque island according to claim 1, wherein said firebox is adapted to burn solid fuel.

6. A system for constructing a barbeque island according to claim 1, further comprising a beverage cooler provided under a counter top mounted to the uppermost of said plurality of stacked courses.

7. A system for constructing a barbeque island according to claim 1, further comprising a grease trap set into one of said stacked courses.

* * * * *